United States Patent [19]

Rosen

[11] Patent Number: 5,702,222

[45] Date of Patent: Dec. 30, 1997

[54] ELECTRICALLY DRIVEN CAR LIFT APPARATUS FOR HOME USE

[75] Inventor: Arnold M. Rosen, Roslyn, N.Y.

[73] Assignee: Park Plus Corporation, Hauppauge, N.Y.

[21] Appl. No.: 696,391

[22] Filed: Aug. 14, 1996

[51] Int. Cl.⁶ .................................................. B66F 7/14
[52] U.S. Cl. .................. 414/228; 414/234; 187/214; 187/216; 187/267; 254/DIG. 2
[58] Field of Search .................................. 414/227, 228, 414/233, 234, 241, 242, 252, 261; 187/203, 204, 210, 220, 267, 268, 214, 216; 254/DIG. 2, 98

[56] References Cited

U.S. PATENT DOCUMENTS

| Re. 25,923 | 12/1965 | Powell | 187/216 |
| 2,843,222 | 7/1958 | Villars | 187/216 X |
| 3,687,234 | 8/1972 | Gendreau | 187/267 |
| 3,958,664 | 5/1976 | Perkins | 187/214 X |
| 4,079,847 | 3/1978 | Kochanneck . | |
| 4,209,276 | 6/1980 | Rosen . | |
| 4,434,872 | 3/1984 | Daniels, Jr. | 187/220 |
| 4,747,242 | 5/1988 | Aarstad | 414/233 X |
| 4,772,172 | 9/1988 | Rosen . | |
| 5,145,304 | 9/1992 | Rosen . | |

FOREIGN PATENT DOCUMENTS

| 23 47 130 | 4/1975 | Germany . | |
| 81503 | 3/1994 | Japan | 414/227 |
| 2 051 004 | 1/1981 | United Kingdom . | |

*Primary Examiner*—Frank E. Werner
*Attorney, Agent, or Firm*—Anthony J. Casella; Gerald E. Hespos; Ludomir A. Budzyn

[57] ABSTRACT

An electrically driven car lift apparatus for use in a private garage is provided which operates on standard household electrical power. The lift apparatus is driven by two screws, one being directly connected to an electrical driving device with a transmission carrying rotational force to turn the second screw. The direct mounting of the electric drive device to the lift apparatus reduces the necessary area required to operate the lift apparatus and creates a convenient design for use in a typical space-restricted private home garage.

10 Claims, 4 Drawing Sheets

ELECTRICALLY DRIVEN CAR LIFT APPARATUS FOR HOME USE

BACKGROUND OF THE INVENTION

1. Field of the Invention

This invention is directed to apparatus for parking automobiles, and, more particularly, to an electrically driven car lift for home use.

2. Description of the Prior Art

Car lift apparatus are used to park vehicles in a vertical relationship in an area that substantially corresponds to the area of a standard vehicle parking space. In particular, a car lift apparatus comprises a platform formed to accommodate a vehicle, which can be raised to a sufficient height such that a second vehicle may be parked thereunder.

Today, many homeowners and apartment dwellers have access to their own private garages comprising of one or two parking spaces. However, due to increased mobility in society and affordability of automobiles, one or two parking spaces are often inadequate with people commonly owning three or four vehicles. This problem is further highlighted with automobile restoration hobbyists who keep a prized automobile in the garage and park their day-to-day automobile on the street or in some other public venue. Car lift apparatus have been used in both open vehicle parking lots and enclosed commercial parking garages to double, or in some cases triple, parking capacity and may be used to increase the parking capacity of a home garage. An extremely effective prior art vehicle parking apparatus is shown in U.S. Pat. No. 4,209,276 which issued to the applicant herein on Jun. 24, 1980 entitled "VEHICLE PARKING APPARATUS". The lift apparatus of U.S. Pat. No. 4,209,276 includes a base frame with two spaced stanchions extending therefrom. A platform formed to accommodate a vehicle is disposed between the stanchions and is mounted to a guide slidably disposed within each stanchion. A pair of hydraulic pistons and cylinder assemblies are pivotally mounted to the base frame and pivotally connected to the platform. Through hydraulic actuation, the pistons are extended and withdrawn resulting in a respective raising or lowering of the platform relative to the lift apparatus. Despite the many advantages of the vehicle parking apparatus disclosed in U.S. Pat. No. 4,209,276, the apparatus occupies a total height of approximately 11'-4" which exceeds the floor to ceiling height in many private garages. Also, the limited space and clutter of a typical private garage may not allow for the movement of the relatively large pistons used to operate the lift apparatus of U.S. Pat. No. 4,209,276.

A vehicle parking apparatus which remedies the height problems inherent in U.S. Pat. No. 4,209,276 is disclosed in U.S. Pat. No. 4,772,172 which issued to the applicant herein on Sep. 20, 1988 entitled "LOW PROFILE VEHICLE PARKING APPARATUS". The parking apparatus disclosed in U.S. Pat. No. 4,772,172 includes two upstanding stanchions extending from a base with a platform horizontally disposed between the stanchions formed to accommodate a vehicle. The platform is raised and lowered through the manipulation of articulated stabilizing bar assemblies mounted between the platform and the base. The articulated stabilizing bar assemblies each include a rocker arm and a control arm articulated to one another, with the rocker arm further articulated to the platform and the control arm further articulated to the base. A piston and cylinder assembly is pivotally mounted to each of the articulated stabilizing bar assemblies. The stroke of the piston within the cylinder corresponds to the allowable travel of the platform from a lowest position to a fully elevated position. The piston and cylinder assemblies are connected to the articulated stabilizing bar assemblies such that the full extension of the pistons within the cylinder assemblies corresponds to the platform being in the lowest position, whereas, the pistons being fully retracted within the cylinder assemblies corresponds to the platform being in a fully elevated position. With the platform being in a fully elevated position, a latch means is provided to secure and maintain the platform in such position. The parking apparatus disclosed in U.S. Pat. No. 4,772,172 achieves the extremely desirable attribute of having a very low profile to enable the use of a parking apparatus within a confined space that previously could not accept such parking devices. The apparatus of U.S. Pat. No. 4,772,172 may assume a maximum height of between approximately 9.5' and 10', measured from the floor to the top of a vehicle on the platform in a fully elevated position.

Since certain indoor facilities have maximum height restrictions less than 9.5', the applicant herein obtained U.S. Pat. No. 5,145,304 on Sep. 8, 1992 entitled "HEIGHT ADJUSTABLE VEHICLE PARKING APPARATUS" which discloses a parking apparatus that can be adjusted to the available height in a parking facility and to the needed height for the vehicles, and that can be used in spaces having a height less than 9.5'. The parking apparatus of U.S. Pat. No. 5,145,304 comprises a base, a pair of upstanding stanchions, a platform, articulated stabilizing bar assemblies and piston and cylinder assemblies similar to that of the parking apparatus of U.S. Pat. No. 4,772,172. Flange members are mounted to each of the stanchions of the parking apparatus of U.S. Pat. No. 5,145,304 which include a plurality of bolt holes formed to engage rigid support members. The rigid support members can be locked at any location along the length of the flange members with the rigid support members being formed to include horizontal engaging beams. Latch means are disposed on the platform and formed to cooperatively engage the engaging beams of the rigid support members. The latch means is operative to mechanically engage the rigid support members to keep the parking platform in an elevated condition at a plurality of intermediate heights approximately between 6.0' and 8.0'.

Although the parking apparatus of U.S. Pat. No. 4,772,172 and U.S. Pat. No. 5,145,304 are extremely desirable for use in indoor parking facilities, the confines of a private garage may not permit the movement of the articulated stabilizing bar assemblies along with the piston and cylinder assemblies. Furthermore, the piston assemblies of all three cited prior art patents are hydraulically operated. A hydraulic system is very complex requiring extensive tubing having supply and return lines connected to a pump and often to a stand-by pump, with mechanical drives being required for each pump. Although appropriate for commercial use, the hydraulically operated mechanisms of these prior art car lift apparatus may require a substantial amount of area which is not available in a private garage.

Therefore, it is an object of the subject invention to provide a new and improved vehicle parking apparatus having a compact drive mechanism for operating the apparatus which is electrically driven and appropriate for home use.

It is also an object of the subject invention to provide a new and improved vehicle parking apparatus having a platform non-rotatably mounted to a pair of screws so that the platform may translate the length of the screws and correspondingly be raised or lowered.

Yet another object of the subject invention is to provide a new and improved vehicle parking apparatus having a pair of lifting assemblies for supporting a platform, the lifting assemblies being formed to translate along the length of the screws.

Also, another object of the subject invention is to provide a new and improved vehicle parking apparatus operated by a pair of screws, one screw being driven by an electric motor and the second screw being driven through a chain transmission at substantially the same rate and in the same rotational direction as the first screw.

SUMMARY OF THE INVENTION

The objects of the present invention are met by an electrically driven, screw operated car lift apparatus having a compact lifting mechanism appropriate for use in a private garage.

The new and improved car lift apparatus of the subject invention includes two elongated, spaced stanchions mounted to a base frame. Cylindrical screws are rotatably disposed within the respective stanchions. A substantially planar platform is horizontally mounted to lifting assemblies disposed within each stanchion. Each lifting assembly comprises a nut threadedly engaged to one of the screws. An electric motor is mounted to the free end of one of the stanchions for rotating the screw disposed therein. Sprockets are mounted onto the ends of the screws disposed in the base frame and a continuous chain is disposed in meshing engagement with both sprockets. The force of rotation transmitted to the screw directly driven by the electric motor is transmitted to the second screw through the sprockets and chain such that both screws substantially rotate at the same rate and in the same direction. The rotation of the screws causes simultaneous translation of the nuts along the length of the screws with the platform correspondingly being elevated or lowered.

The subject invention is formed with the stanchions having a length which corresponds to the roof of a raised automobile and within the clearance of a typical home garage. Also, with the electric motor being mounted directly to a stanchion, the new and improved car lift apparatus of the subject invention requires minimal area and provides a compact design which can be used in the relatively small confines of a private garage. The electric motor may be powered by electricity found in the standard household.

The car lift apparatus of the subject invention will not fail due to a power outage since the nuts of the lifting apparatus will remain in threaded engagement with the screws throughout such a power loss and maintain the platform at a fixed position. The nuts may be formed from Vesconite, which is a relatively strong plastic that ensures sufficient support for the platform and a raised automobile.

These and other features of the invention will be better understood through a study of the following detailed description of the invention and the accompanying drawings.

DETAILED DESCRIPTION OF THE PREFERRED EMBODIMENTS

Figure 1:
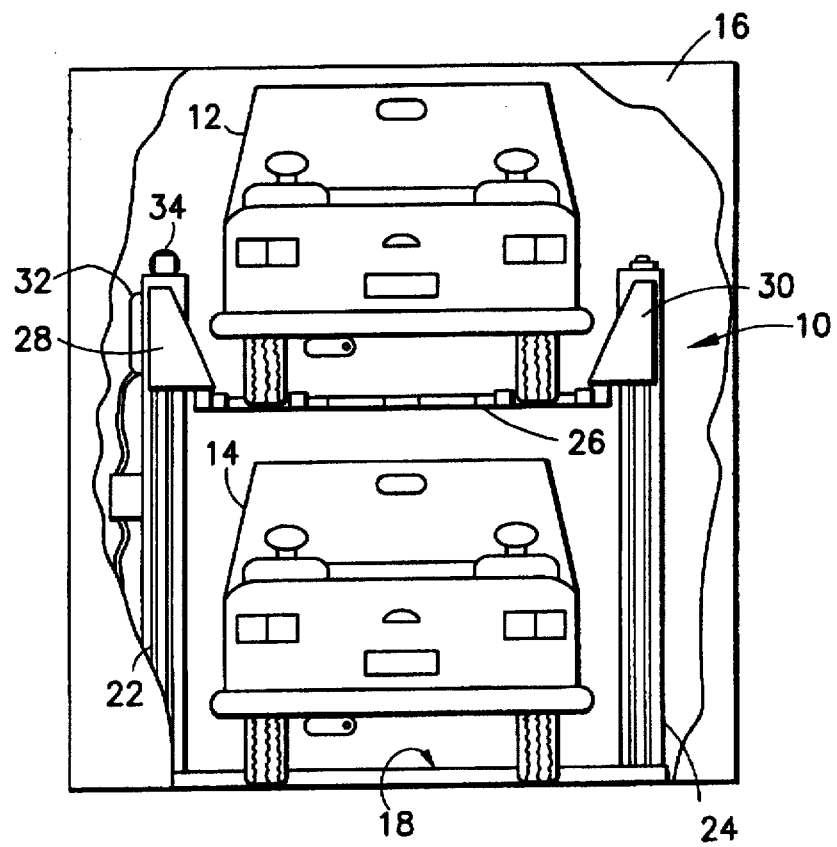
FIG. 1 is a plan view of the new and improved car lift apparatus of the subject invention.

Referring to FIG. 1, a car lift apparatus 10 is illustrated in an operative position wherein a first vehicle 12 is vertically supported above a second vehicle 14 in a private garage 16. The apparatus 10 comprises a base frame 18 including upstanding stanchions 22, 24, a platform 26 which is dimensioned to accommodate the vehicle 12, and reversible lifting assemblies 28, 30 which are controlled by an electric motor 32 through a rotational reducer 34.

Figure 2:
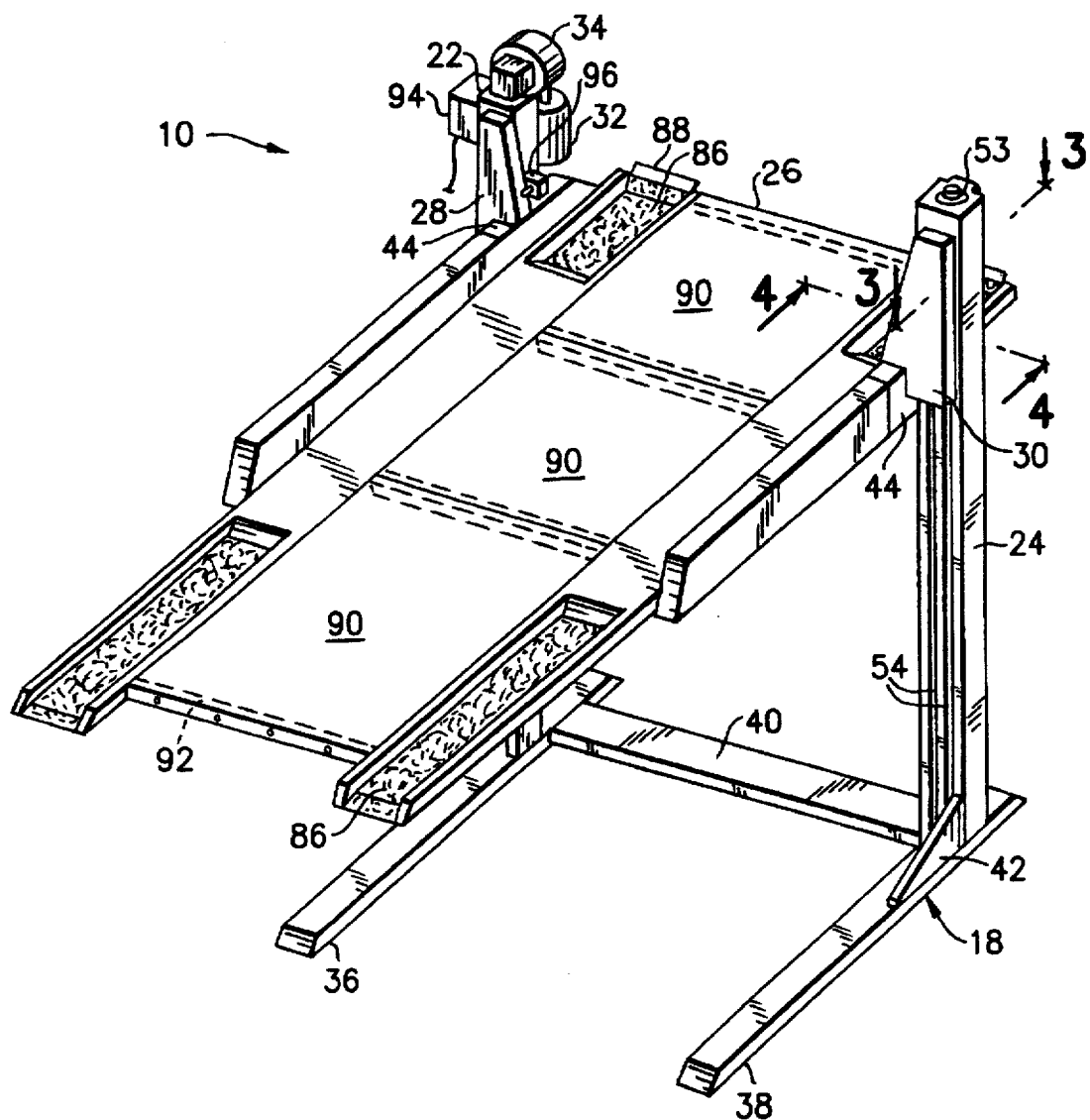
FIG. 2 is a perspective view of the new and improved car apparatus of the subject invention.

The car lift apparatus 10 is more clearly illustrated in FIG. 2, with the base frame 18 including two spaced legs 36, 38 that are spaced horizontally sufficiently to accommodate the vehicles to be parked, and that are of sufficient length to brace the upstanding stanchions 22, 24 of the apparatus 10. Extending between the legs 36, 38 is a lateral support member 40 which also functions to house the transmission, as more fully described hereinafter. The lateral support member 40 is formed with a trapezoidal profile to allow a vehicle to drive into a parked position under the platform 26, when the platform 26 is in an elevated position. The platform 26 is formed to nest with the trapezoidal profile of the lateral support member 40, when the platform 26 is in a fully lowered position. The stanchions 22, 24 are rigidly secured to the base frame 18 and supported by braces 42.

Figure 3:
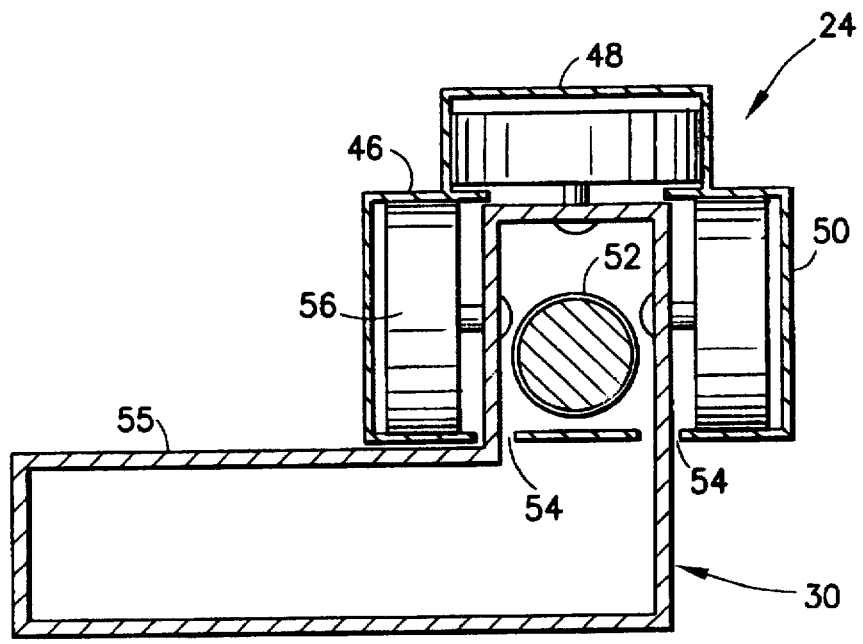
FIG. 3 is a sectional view of a stanchion taken along lines 3—3 in FIG. 2.

The platform 26 is mounted within U-shaped brackets 44 of the reversible lifting assemblies 28, 30. FIG. 3 shows the cross-section of the stanchion 24 with the lifting assembly 30 disposed therein. The cross-section of the stanchion 22 and the lifting assembly 28 are identically formed as the cross-section of the stanchion 24 and the lifting assembly 30, respectively. As shown in FIG. 3, the stanchion 24 includes four faces, three of which are formed by elongated channels 46, 48, 50 which extend the entire length of the stanchion 24. A pair of spaced, parallel slots 54 are formed in the fourth face of the stanchion 24 which substantially extend the length thereof. A cylindrical screw 52 is rotatably mounted to both ends of the stanchion 24 with journal assemblies 53. The lifting assembly 30 includes a generally L-shaped lifting body 55 which is disposed through the slots 54 and about the screw 52. The slots 54 allow the lifting assembly 30 to move axially along a substantial portion of the screw 52.

Figure 4:
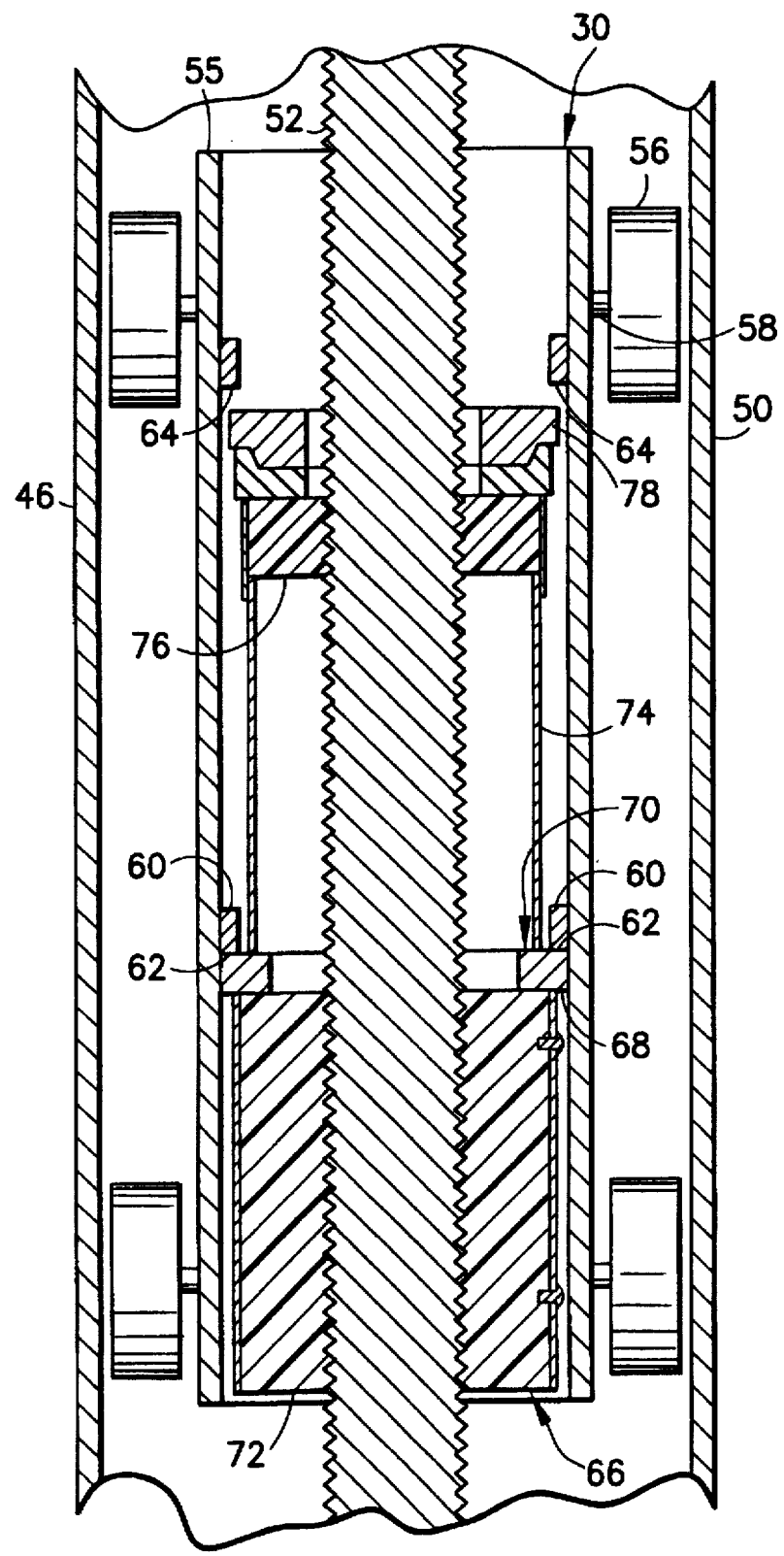
FIG. 4 is a sectional view of a stanchion taken along lines 4—4 in FIG. 2.

As shown in FIGS. 3 and 4, the lifting assembly 30 includes six rollers 56 rotatably mounted to axles 58 extending from the lifting body 55. The rollers 56 are arranged so that two of the rollers are spaced apart in rolling engagement with each of the channels 46, 48, 50 at opposite ends of the lifting body 55. A pair of lifting blocks 60 is secured to opposing inner walls of the lifting body 55 at points intermediate the length thereof. The lifting blocks 60 are to be secured so that the lower edges 62 are substantially co-planar. Also, the lower edges 62 must be substantially orthogonal to the walls of the lifting body 55. The method by which the lifting blocks 60 are secured to the lifting body 55 cannot adulterate the lower edges 62 and cause the lower edges 62 to be askew. The lifting assembly 30 also includes a pair of safety blocks 64 secured to the inner wall of the lifting body 55 which are mounted with the same considerations as the lifting block 60.

As shown in FIG. 4, a screw engaging assembly 66 is disposed within the lifting body 55 and about the screw 52. The screw engaging assembly 66 includes a lifting member 68 formed with an outer surface having the same configuration as the inner surface of the lifting body 55, but with slightly smaller dimensions. The configuration of the outer surface of the lifting member 68 and the inner surface of the lifting body 55 must be such as to prevent rotation of the lifting member 68 within the lifting body 55. Preferably, the lifting member 68 is formed with a rectangular cross-section which conforms to the rectangular portion of the cross-section of the lifting body 55 disposed about the screw 52. The top surface 70 of the lifting member 68 is substantially planar and formed to engage the lifting blocks 60. The lifting member 68 is secured to a lifting nut 72. The nut 72 is formed to cooperate with the screw 52 to allow translation of the nut 72 along the length of the screw 52. The nut 72 may be formed from any durable material, preferably from a hard plastic, such as Vesconite. To aid the translation of the nut 72 along the length of the screw 52, a grease chamber 74 may be provided for accommodating a lubricant and containing it in contact with the outer surface of the screw 52.

The screw engaging assembly 66 also comprises two safety components. First, a safety nut 76 is provided as a reserve should the nut 72 fail. Second, a safety brake 78 is formed to substantially engage the safety blocks 64. If the nut 72 or the lifting blocks 60 would fail, the lifting assembly 30 would translate slightly downward. The safety blocks 64 would come into engagement with the safety brake 78 and be supported by the safety nut 76 or a combination of the nut 72 and the safety nut 76.

Referring to FIG. 2, an electric motor 80 is mounted to the stanchion 22 for driving the screw 52 disposed within the stanchion 22. The electric motor may be coupled to the screw 52 through a chain drive, which is not shown, or a rotational reducer 34. The rotational reducer 34 is formed to reduce the rotational speed supplied by the electric motor 32 and deliver the reduced speed to the screw 52. The rotational reducer 34, like the electric motor 32, is directly mounted to the stanchion 22. Standard household electrical power may be used to operate the electric motor 32, and thus the lift 10, with a voltage of either 110 volts or 220 volts.

Figure 5:
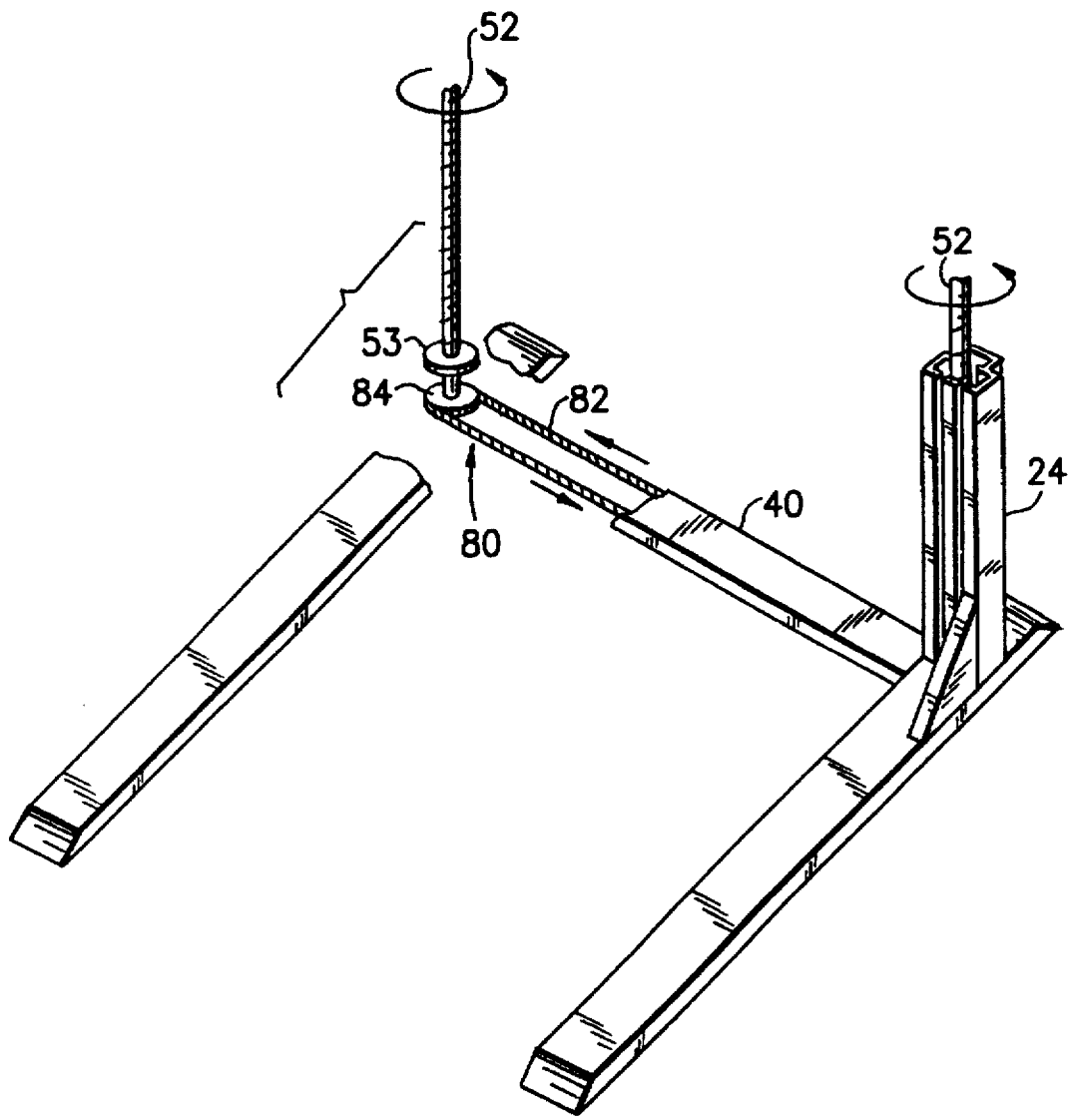
FIG. 5 is a perspective view of the chain transmission of the subject invention.

The rotational force supplied by the electric motor 32 is transmitted from the screw 52 disposed within the stanchion 22 to the screw 52 disposed within the stanchion 24 through a transmission 80, as shown in FIG. 5. The transmission 80 comprises a continuous chain 82 disposed in meshing engagement about sprockets 84 mounted to the ends of the screws 52 within the base frame 18. The chain 82 extends between the stanchions 22, 24 under the lateral support member 40 of the base frame 18. The transmission 80 rotates the screw 52 disposed within the stanchion 24 in the same direction and at substantially the same rate as the driven screw 52 within the stanchion 22.

As shown in FIG. 2, the platform 26 is formed with four wheel wells 86 dimensioned to accommodate the four tires of a vehicle. The wheel wells 86 are sunken into the platform 26 and formed with textured surfaces which prevent a vehicle from rolling off the platform 26 with the platform 26 being in a raised position. Also, chocks 88 may be mounted to the front wheel wells 86 to provide additional safety against unintended vehicle movement. The platform 26 may be formed as a unitary member, not shown, or with removable panels 90 which are supported by transverse supports 92. Any number of the panels 90 may be removed to allow an individual to work on a vehicle with the platform 26 in a raised position.

The lift apparatus 10 is controlled and operated from control box 94 which is mounted to stanchion 22. A limit switch 96 may be provided to limit the upward translation of the platform 26 to a fully elevated position. The limit switch 96 is slidably mounted in the stanchion 22 and is dimensioned to engage a shut-off switch, not shown, which is wired to the control box 94 and configured to deactivate the lift 10 upon the platform 26 being raised to a fully elevated position. The shut-off switch will not prevent the lowering of the platform 26 from the fully elevated position.

In operation, the electric motor 32 is activated which, through the rotational reducer 34, turns the screw 52 within the stanchion 22. Simultaneously, the sprocket 84 is rotated with the chain 82 causing the screw 52 within the stanchion 24 to turn in the same direction and at substantially the same rate as the driven screw 52 within the stanchion 22. Since the lifting members 68 are configured to the inner dimensions of the lifting bodies 55 and the nuts 72 are secured thereto, the nuts 72 are prevented from simply rotating with the screws 52 as the screws 52 rotate. Also, the rollers 56 counteract any rotational movement of the lifting bodies 55 through engagement with the channels 46, 48, 50. Torque, which is created by the rotation of the screws 52, is transmitted through the threads of the screws 52 to the threads of the nuts 72 and causes the nuts 72 to translate upwardly or downwardly along the length of the screws 52

The lifting blocks 60 will rest against the lifting members 68 with a vehicle loaded on the platform 26. As the nuts 72 simultaneously translate along the length of the screws 52, the lifting assemblies 28, 30 will correspondingly translate along with the platform 26 which is mounted thereto. The rollers 56 guide the lifting assemblies 28, 30 within the stanchions 22, 24 as the nuts 72 translate. A stoppage in the supply of power to the electric motor 32 will halt the apparatus 10 with the nuts 72 being fixed on the screws 52 corresponding to the point of the power outage. The platform 26 will remain at a fixed position until power is once again supplied to the electric motor 32 to enable the nuts 72 to further translate along the screws 52.

As is readily apparent, numerous modifications and changes may readily occur to those skilled in the art, and hence it is not desired to limit the invention to the exact construction and operation shown and described, and accordingly all suitable modification equivalents may be resorted to falling within the scope of the invention as claimed.

What is claimed is:

1. An electrically driven car lift apparatus for raising an automobile, said car lift apparatus comprising:

a base;

a pair of spaced apart upstanding stanchions rigidly connected to said base and aligned to be substantially parallel, each said stanchion being formed to define several elongated channels extending the length of said stanchions, each said channel being at least partially defined by an elongated planar base and at least one pair of elongated side walls, said side walls being disposed intermediate a plane defined by said planar base and the center of said respective stanchion;

a first threaded screw rotatably disposed within one said stanchion extending from said base substantially the length of said one said stanchion, said screw having two opposed ends with a first sprocket mounted to said end disposed within said base;

a second threaded screw rotatably disposed within the other said stanchion extending from said base substantially the length of said other said stanchion, said screw having two opposed ends with a second sprocket mounted to said end disposed within said base, wherein said sprockets are substantially coplanar;

a continuous chain disposed in said base and in meshing engagement about said first and said second sprockets;

a pair of lifting assemblies, each said lifting assembly corresponding to a single said stanchion, each said lifting assembly having a body, a portion of said body being disposed within said corresponding stanchion such that said portion of said body at least partially encircles said screw disposed in said corresponding stanchion, at least one lifting nut threadedly engaged to said screw disposed within said corresponding stanchion, said at least one lifting nut being non-rotatably disposed within said portion of said body, and a plurality of rollers rotatably mounted to said portion of said body, each said roller being at least partially disposed within a single said channel such that said roller is in rolling engagement with said side walls which partially define respective said channel;

a substantially planar platform formed to accommodate the automobile and supported by said lifting assemblies so as to be aligned substantially perpendicular with said stanchions; and an electric driving means for rotating said first screw and said first sprocket, wherein rotation of said first sprocket engages said chain and causes rotation of said second sprocket and said second screw, and wherein rotation of said screws causes said lifting nuts to translate along the length of said screws, the lifting assemblies and the platform translating therewith.

2. A lift apparatus as in claim 1, wherein said electric driving means is mounted to the end of said first screw opposite said first sprocket.

3. A lift apparatus as in claim 1, wherein said lifting nuts comprise a hard plastic.

4. A lift apparatus as in claim 1, wherein said platform comprises at least one removable panel, whereby the removal of said panel gives access to an underside of the automobile.

5. A lift apparatus as in claim 1, wherein each said lifting assembly is formed with a plurality of axially spaced rollers in rolling engagement with said side walls of each said channel.

6. A lift apparatus as in claim 1, wherein each said lifting assembly further includes a safety nut threadedly engaged to said screw disposed within said corresponding stanchion, said safety nut being non-rotatably disposed in said portion of said body, and at least one safety support block extending from said portion of said body, said at least one safety support block being axially spaced in a gravitationally upward direction from said safety nut, said at least one safety block being formed to cooperate with said safety nut to support said lifting assembly.

7. A lift apparatus as in claim 6, wherein each said lifting assembly further comprises a safety break intermediate said safety nut and said at least one safety support block.

8. A lift apparatus as in claim 1, wherein each said lifting assembly further comprises means for lubricating the threads of said screw disposed within said corresponding stanchion.

9. A lift apparatus as in claim 1, wherein said portions of said bodies disposed within said stanchions are each formed with an inner surface which cross-sectionally defines a non-circular shape about said screw disposed in said corresponding stanchion, and wherein each said lifting nut has an outer surface which substantially cross-sectionally defines the shape and dimensions of said inner surface of respective said portion of said body.

10. A lift apparatus as in claim 1, wherein said body of each said lifting assembly includes a second portion which extends from said corresponding stanchion to define a free end spaced from said corresponding stanchion, each said second portion being formed not to partially or fully encompass said corresponding stanchion, and wherein said platform being secured to said free ends of said lifting assemblies.

* * * * *